FIG. 1

INVENTORS
EDWARD J. FLOREK
THOMAS F. O'HARE
SALVATORE J. DI PAOLO
JOHN E. HAEFELI
OSCAR BERENBERG
BY Herbert L. Davis
ATTORNEY

INVENTORS
EDWARD J. FLOREK
THOMAS F O'HARE
SALVATORE J. DI PAOLO
JOHN E. HAEFELI
OSCAR BERENBERG

United States Patent Office 3,482,231
Patented Dec. 2, 1969

3,482,231
INTEGRITY MONITOR AND SHAFT
POSITION COMPARATOR
Edward J. Florek, Brooklyn, N.Y., Salvatore J. Di Paolo, Hackensack, N.J., Thomas F. O'Hare, New York, N.Y., John E. Haefeli, Clifton, N.J., and Oscar Berenberg, Floral Park, N.Y., assignors to The Bendix Corporation, a corporation of Delaware
Filed Sept. 26, 1966, Ser. No. 581,882
Int. Cl. G08c 25/00; G08b 21/00
U.S. Cl. 340—198                                      17 Claims

ABSTRACT OF THE DISCLOSURE

This invention relates to an integrity monitor and shaft position comparator and, more particularly, to improvements in a device for monitoring the integrity of conductors connecting the stator windings of two synchros of a data transmission system, where one synchro is a transmitter synchro and the other is a receiver synchro and in which monitoring system a resultant error signal appears when there is a break in any of the connecting conductors and to improvements in a device for monitoring changes in relative rotational displacement between two shafts controlling synchro transmitters of a pair of said data transmission systems to effect a warning indication when the relative rotational displacement results in an inequality or error signal which exceeds a present value, as well as monitoring the integrity of the conductors of said systems.

BACKGROUND OF THE INVENTION

The invention in the integrity monitor is particularly adapted for use with an A.C. data transmission system of a type in which there has been heretofore utilized error detecting and indicating monitor systems such as disclosed and claimed in U.S. Patent No. 3,038,149, granted June 5, 1962 to Frederick B. Sylvander, U.S. Patent No. 3,038,150, granted June 5, 1962 to Paul F. Bechberger, and U.S. Patent No. 3,109,129, granted Oct. 29, 1963 to Murray Putzer, Frederick B. Sylvander and Robert J. Molnar, all of which patents have been assigned to The Bendix Corporation. Such monitor systems of the patents may be applied to back to back connected synchros and may be applied to a variable induction type transformer system including A.C. transmitter and receiver devices or control transformers, wherein the transmitter and receiver devices are of a conventional type in which three output terminals of each transmitter are connected to three input terminals of a remotely located receiver. The monitor systems of the patents require, however, that the performance of the data transmission system will not be substantially deteriorated by the application of a D.C. current to the windings of the A.C. devices.

A basic danger in the use of such three wire data transmission systems is that a short circuit or breakage of one of three interconnecting wires will in effect result in the transmission of incorrect data. However, in such case while faulty electrical data may then be transmitted to the receiver, it is difficult to notice any difference in the operation of the system under such faulty conditions from that under normal operation conditions.

In the prior fault detecting and indicating monitor systems disclosed in the aforenoted patents, there is provided in one of the three interconnecting leads between the transmitting and receiving devices of the data transmitting system a capacitor of low impedance having opposite sides connected into a normally balanced D.C. bridge circuit which is responsive to the D.C. current applied to the windings of the A.C. devices so as to apply an output signal controlling some type of warning device such as a micro-ammeter operated warning flag, light, bell or other suitable warning means upon the D.C. bridge circuit becoming unbalanced by a breakage of one of the three interconnecting wires or fault in the stator windings of either the synchro transmitter or synchro receiver and which would otherwise cause the transmission system to transmit incorrect data.

One type of error detecting and indicating system in use at the present time detects rotational displacement between two shafts, controlling signal transmitting synchros, by comparing the amplitudes of the output voltages of the two synchros, said amplitudes being proportional to shaft orientation.

The integrity monitor and shaft position comparator of the present invention is further adapted for use with a dual A.C. data transmission system to effect a warning indication upon a relative rotational displacement between shafts controlling signal transmitting synchros exceeding a present value.

One such device is disclosed in Sylvander et al., Patent No. 3,108,263, assigned to The Bendix Corporation, assignee of the present invention. The limitation in this type of device lies in the fact that the electrical signal corresponding to shaft position is, at certain points on the sinusoidal output corresponding to shaft position virtually constant, i.e., an appreciable shaft rotation results in only a small signal amplitude variation. Thus, the error signal, which is a combination of two such signals corresponding to shaft position is, at certain portions of the sine wave, extremely small, and thus comparison of the magnitude of the two voltages corresponding to shaft orientation will result in an error signal small enough to be affected by noise levels, or otherwise difficult to detect.

It is an object of the instant invention to provide novel means for providing an error indication in the event of a fault in the operating lines between the data transmitting device and the data receiving device.

It is another object of said invention to avoid the necessity of applying a D.C. monitoring current to the windings of the data transmission system, together with the insertion of a capacitor in one of the conductor leads of the system as well as the D.C. bridge circuit by the provision of a data transmission integrity monitoring means, including a resistance-capacitance network for providing an alternating current output of a magnitude independent of the orientation of a control shaft positioning a rotor winding of a synchro transmitter, but the magnitude of which signal changes upon a break in the wire of the interconnecting leads or windings of either the synchro transmitter or the synchro receiver to provide a fault indicative signal.

It is another object of the invention to provide control means operated by the energizing source of a synchro data transmission system to effect an electrical monitoring signal, the magnitude of which is independent of the orientation of the rotor winding of a synchro signal transmitter so as to be independent of the point on the sine wave of the input signal at which the transmitted signal is measured, but the magnitude of which signal is effectively changed upon a fault in the data transmission system to operate a suitable indicator means.

It is another object of the invention to provide a monitor circuit for a synchro in which the output of the synchro is in the form of three voltages, the magnitudes of which are functions of a synchro control shaft position, and which outputs of the synchro are in turn connected to a Scott T transformer so as to yield output voltages which are proportional to the sine and cosine of the synchro shaft angle $\theta$ and which differ by a 90° phase angle in space, while in order to eliminate the variations in the magnitude of the output voltages with the shaft rotation, the Scott T transformer output voltages are combined in a resistance-capacitance network, connected across the outputs of the Scott T transformer, and having the values of the resistance and capacitance elements of which network so selected as to satisfy the relationship $\omega RC=1$ at the frequency of the alternating current energizing the synchro, so that the resultant voltage at the output of the resistance-capacitance network under normal operating conditions is of a constant amplitude and is independent of the synchro shaft position, while the arrangement is such that upon a malfunction arising due, for example, to a "break" or short in stator windings or conductors of the synchros, there will result an unbalanced configuration of the synchro windings so that the previous condition of a constant amplitude output from the resistance-capacitance network based on the sine and cosine relationship of the balance stator configuration no longer exists, and there then results a change in the amplitude of the output voltage to effect through suitable alarm circuitry an indication of the malfunction condition.

It is another object of the invention to provide means for providing a direct current bias signal equal in magnitude to the monitoring signal normally effected by said control means including the resistance-capacitance network, together with means for effecting a comparison of the two aforesaid signals so as to provide a resultant error signal upon a change in the magnitude of the signal effected by the control means as upon a fault in the data transmission system.

It is another object of the invention to provide a novel combination of circuitry including interconnected stator windings of a data transmission system including a synchro transmitter and a synchro receiver, an electrical signal input to the synchro transmitter corresponding to a shaft displacement $\theta$ of a rotor winding of the synchro transmitter from a reference orientation, means for effecting an A.C. signal of a magnitude independent of the position of the rotor winding, but of a magnitude which changes upon a fault in the data transmission system, means for rectifying said A.C. signal into a D.C. monitoring signal, means for providing a biasing signal equal to the magnitude of the D.C. monitoring signal under normal operating conditions of the data transmission system, means for combining said signals so as to provide an error signal upon the monitoring signal changing upon a fault in the data transmission system, and means to indicate the presence of said error signal.

It is another object of the invention to provide in cooperation with a data transmission system an alternating current electrical signal responsive means including a resistance-capacitance network for providing an alternating current output responsive in phase to orientation of a control shaft of a rotor winding of a signal transmitting synchro, but of a magnitude which is independent of the orientation of the rotor winding and a magnitude which is effectively changed upon a fault arising in the data transmission system to operate a suitable fault indicator means.

It is another object of the invention to provide an electrical alternating current signal means arranged in cooperative relation with a dual data transmission system and the alternating current signal responsive means including resistance-capacitance networks to effect signals responsive in phase to relative orientations of a pair of control shafts for signal transmitting synchros in the dual data transmission system, while the magnitudes of the signals are independent of the orientations of the shafts.

It is a further object of the invention to provide in cooperation with a dual data transmission system a pair of electrical signal devices effecting sinusoidal output signals having phases dependent upon corresponding orientations of controlling shafts of the dual systems, but each of the sinusoidal signals being of a magnitude independent of the orientations of the shafts, but which magnitude may be effectively changed upon a fault arising in the corresponding data transmission system to effect a fault indication.

It is another object of the invention to provide a novel combination of circuitry comprising an electrical signal input means corresponding to a displacement $\theta$ of a control shaft of a signal transmitting synchro from a reference orientation, means for effecting an electrical signal having a magnitude independent of shaft position, but responsive in phase to the control shaft position, means for combining two such signals from signal transmitting synchros to provide a difference or error signal in which the magnitude of said error signal is proportional to relative angular displacement of one synchro control shaft to the other synchro control shaft, and means to indicate the presence of said error signal when it exceeds a predetermined value.

It is another object of said invention to provide means for effecting a comparison of two of said signals so as to provide a resultant error signal dependent upon the respective phase angles of said signals as well as the respective amplitudes thereof.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

DESCRIPTION OF THE INVENTION

In the drawings corresponding numerals indicate corresponding parts in the respective views:

FIGURE 4 is a graphical representation of a resulting error signal plotted against time, said error signal appearing at the output junction of the summing amplifier upon two conditions shown graphically at FIGURES 3A and 3C obtaining due to the relative displacement in angular orientation of the rotors of the synchronous transmitters 3 and 3A and in which the positive going portion of the error signal is shown by a solid line indicating the half wave rectification action of diode 214 of FIGURE 2, while the negative going portion of the error signal of FIGURE 4 has been represented by dashed lines indicating that the negative going portion of the error signal will not appear at the filter detector due to the half wave rectification action of the diode 214, while upon the conditions shown graphically at FIGURES 3A and 3B obtaining the error signal has a zero value.

Figure 1:
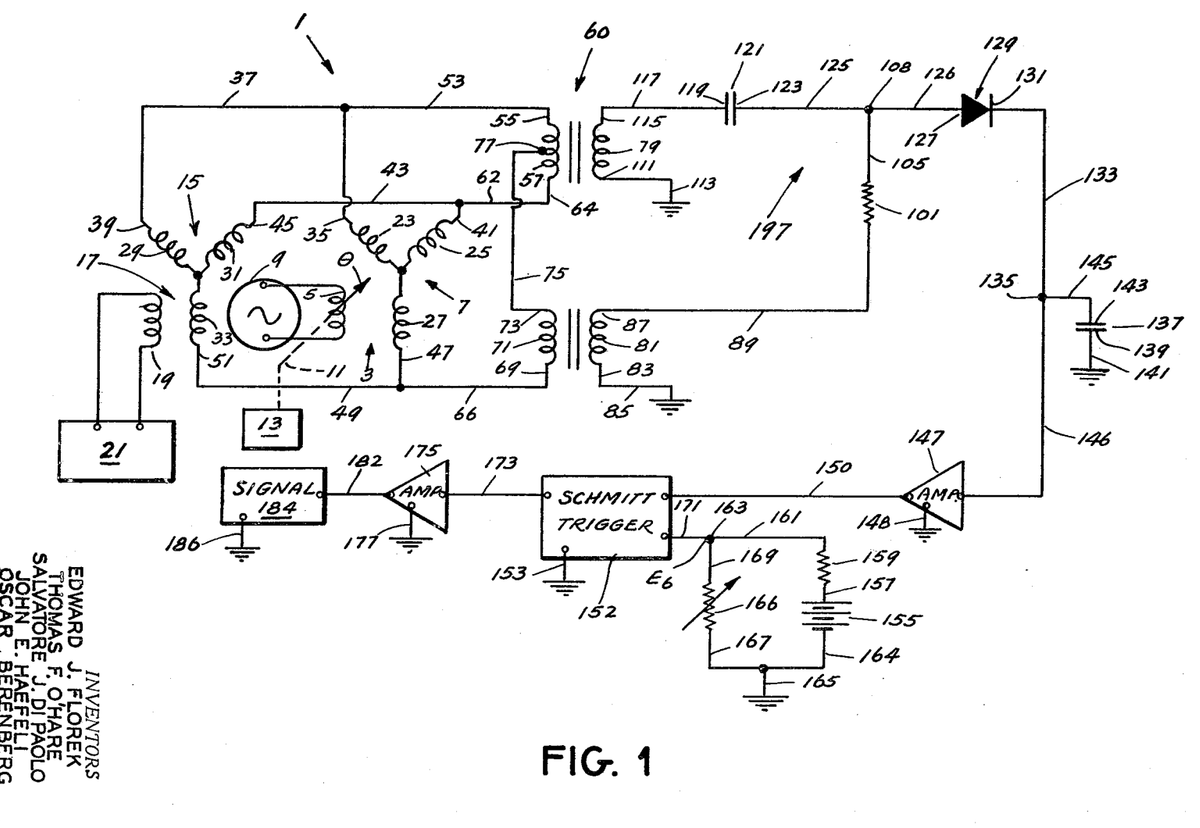
FIGURE 1 is a schematic wiring diagram of an integrity monitor embodying the invention.

Referring now to the drawing of FIGURE 1, there is shown a data transmission system 1 including a synchro transmitter 3 having a rotor winding 5 and a stator winding 7 with the rotor winding 5 being energized by an alternating current of a predetermined constant magnitude and frequency supplied from a suitable A.C. source 9. The rotor winding 5 is angularly positoned relative to the stator windings 7 by a shaft 11 which may be operated by a suitable electromechanical system shown schematically by box 13 and which, for example may be an altimeter carried by an aircraft, in which case the source 9 of the predetermined constant magnitude and frequency alternating current may be a conventional aircraft 400 cycle alternating current power supply.

The synchro 3 may be a signal transmitter for the conventional type data tranmission system 1 having the rotor winding 5 inductively coupled to the stator windings 7 which are in turn connected in back to back relation to stator windings 15 of a synchro receiver 17 having a winding 19 inductively coupled thereto. The winding 19 of the synchro receiver 17 of the data transmission system 1 may be angularly positioned in a conventional manner in a follow up action in relation to the stator windings 15 or may be fixedly positioned in relation thereto. In either case, upon an angular adjustment of the rotor winding 5 relative to the stator windings 7 there will be induced in the winding 19 by the stator windings 15 an A.C. electrical signal which is in turn applied to the input of a control system 21 which may be of a conventional type.

The stator windings 7 and 15 include windings 23, 25, 27 and 29, 31 and 33 respectively, connected in a Y configuration. The corresponding windings of stator windings 7 and 15 are connected in parallel with one end or leg 35 of winding 23 connected through a conductor 37 to leg 39 of stator winding 29 while leg 41 of stator winding 25 is connected through a conductor 43 to a leg 45 of stator winding 31 and leg 47 of stator winding 27 is connected through a conductor 49 to leg 51 of stator winding 33. One end or leg 35 of stator winding 23 is also connected through a conductor 53 to one end or leg 55 of a primary winding 57 of a Scott T 60 while leg 41 of stator winding 25 is connected through a conductor 62 to the opposite end or leg 64 of the primary winding 57 of the Scott T 60. One end or leg 47 of stator winding 27 is connected through a conductor 66 to one end or leg 69 of a primary winding 71 of the Scott T 60 while the other end or leg 73 is connected through a conductor 75 to a center tap 77 of the primary winding 57.

The primary winding 57 has a 1:1 inductive coupling relationship to a secondary winding 79 while the primary winding 71 has a 0.866:1 inductive coupling relationship to a secondary winding 81. One end or leg 83 of secondary winding 81 is connected through a conductor 85 to ground. An opposite end or leg 87 of secondary winding 81 is connected through a conductor 89 to one end of a resistor 101, the opposite end of the resistor 101 being connected through a conductor 105 to a junction 108. One end or leg 111 of secondary winding 79 is connected through a conductor 113 to ground while an opposite end or leg 115 of secondary winding 79 is connected through a conductor 117 to a plate 119 of a capacitor 121 having an opposite plate 123 of said capacitor 121 being connected through a conductor 125 to junction 108.

Figure 3A:
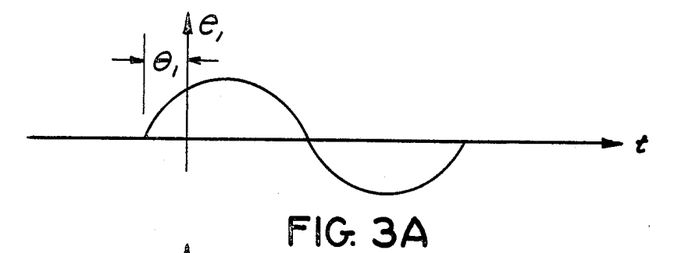
FIGURE 3A is a graphical representation of the electrical signal voltage on a time scale at the output of the Scott T 60 and resistance-capacitance network 197 of FIGURES 1 and 2, with the phase shift signal $\theta_1$ equal to the orientation of the rotor winding of the synchro transmitter 3 relative to a reference position.

The electrical signal ovltage at junction 108, as shown by FIGURE 3A is a sinusoidal wave, the magnitude of which is a constant, i.e., independent of the angular position of the rotor winding 19 of the synchro transmitter 3. This A.C. electrical signal at junction 108 is applied through a conductor 126 to an anode element 127 of a diode 129 having a cathode element 131. The diode 129 provides half wave rectification. The cathode element 131 of said diode 129 is in turn connected through a conductor 133 to a junction 135. A capacitor 137 has a plate 139 connected through a conductor 141 to ground and its opposite plate 143 connected through a conductor 145 to the aforesaid junction 135. Junction 135 is in turn connected through a conductor 146 to an input of buffer amplifier 147 having an input-output terminal connected through a conductor 148 to ground. The buffer amplifier 147 provides a signal through an output conductor 150 leading to one input of a Schmitt trigger 152 having a grounded input-output terminal 153.

A suitable source of direct current voltage, as signified by a battery 155, is connected at its positive terminal through a conductor 157 to one end of a resistor 159, the opposite end of resistor 159 being connected through a conductor 161 to junction 163. The negative terminal of battery 155 is connected through conductors 164 and 165 to ground. A variable resistor 166 is connected at one end through a conductor 167 and conductor 165 to ground, while the other end of said variable resistor 166 is connected through a conductor 169 to the junction 163. The aforesaid circuit provides a biasing electrical signal $E_b$, said biasing electrical signal appearing at junction 163 and being applied through a conductor 171 to a second input of the Schmitt trigger 152, said Schmitt trigger 152 having the opposite input-output terminal 153 connected to ground.

The Schmitt trigger 152 is of a conventional type and when activated, its output is provided through an output conductor 173 to an input of an amplifier 175, said amplifier 175 having a common input-output terminal connected through a conductor 177 to ground. The output of amplifier 175 is applied through a conductor 182 to the input of an indicating device 184, said indicating device having a common input-output terminal connected through a conductor 186 to ground.

OPERATION

In the operation of the integrity monitor, the synchro transmitter 3 and the synchro receiver 17 are connected in back to back relation so that their coresponding stator windings 7 and 15 are joined to each other through conductors 37, 43 and 49. The result of this configuration is that the electrical signals applied across corresponding stator windings will be equal.

The input signal to synchro transmitter 3 will be information concerning the angular orientation of the input shaft 11. This angular orientation of the shaft 11 may be a function, for example, of an aircraft altimeter 13 effecting the position of the rotor winding 5 energized from the A.C. source 9 and inductively coupled to the stator windings 7 of the synchro transmitter 3. The stator windings 7 are in turn connected to the stator windings 15 of the synchro resolver 17 so as to in turn induce an A.C. signal in the winding 19 connected across the input to the control device 21.

The electrical signals of this three wire system are also applied as an input signal to the Scott T transformer 60 and an attendant resistance-capacitance network 197 comprised of resistor element 101 and capacitance element 121. The output electrical signal voltage which thus appears at junction 108 is shown graphically at FIGURE 3A and is of a magnitude independent of the orientation of the rotor winding 5, due to the fact that the resistance and capacitance elements 101 and 121 are so chosen as to make $\omega RC$, i.e., $2\pi fRC$, where $f$ is the frequency of the common alternating current source 9, equal to unity.

Thus, where the common alternating current excitation provided by the A.C. source 9 is of the form $KE \sin \omega t$, the alternating current signal induced in the stator windings 23, 25 and 27 and stator windings 29, 31 and 33 of the synchro transmitter 3 and synchro receiver 17, respectively, will be $E \sin \omega t \cos \theta$ across windings 27 and 33, $E \sin \omega t \cos (\theta-120°)$ across winding 23 and 29, and $E \sin \omega t \cos (\theta-240°)$ across windings 25 and 31 where $\theta$ is the angular orientation from a reference position of rotor winding 5 of the synchro transmitter 3 and K is a constant of proportionality.

Now, letting $E \sin \omega t$ equal A, the signal across the primary winding 57 of the Scott T 60 will be $\sqrt{3}A \sin \theta$ and the signal across primary winding 71 of Scott T 60 will be $-3/2A \cos \theta$, due to the fact that the primary winding 71 is connected at end or leg 73 through a conductor 75 to the center tap 77 on the primary winding 57, the alternating current signals induced in the secondary windings 79 and 81 of the Scott T 60 and now being $\sqrt{3}A \sin \theta$ and $-\sqrt{3}A \cos \theta$ respectively.

For the required condition that $\omega RC$ be equal to unity, the magnitude of the signal at junction 108 will now be $\sqrt{3/2}A$, or transposing, $\sqrt{3/2}E \sin \omega t$. Thus, the phase shift of the signal at junction 108 will be a function of $\theta$, but the magnitude of said signal is independent of $\theta$.

The electrical signal appearing at junction 108 is now transmitted through conductor 126 to a half wave rectifier comprised of diode 129, with the output of said diode 129 being altered by the operation of capacitor 137 which has the function of receiving the half wave rectified signal from diode 129 and charging to a direct current signal level and imposing this level at junction 135.

The direct current electrical signal appearing at junction 135 is now transmitted to the input of the buffer amplifier 147, the function of which is to provide a high impedance load to the resistance-capacitance network 197, Scott T transformer 60, and data transmission system circuitry of the synchro transmitter 3 and synchro receiver 17. The output of buffer amplifier 147, unchanged from the input signal, now provides a first input signal to the Schmitt trigger 152. While a second input signal to said Schmitt trigger 152 is the electrical bias signal $E_b$ provided at junction 163. This biasing signal is the output of the circuit comprising a direct current voltage 155, resistor 159 and variable resistor 166 used to vary said biasing signal. This biasing signal $E_b$ is an input to Schmitt trigger 152 and is set to the precise level of the magnitude of the electrical signal introduced to said Schmitt trigger through the aforementioned buffer amplifier 147 under normal operating conditions. The output applied through conductor 173 of the Schmitt trigger 152 in turn provides the energization to an amplifier 175 which may for example be a conventional type power Darlington, which in turn activates an indicating signal device 184.

It may thus be seen that under normal operating conditions, i.e., where the synchro transmitter 3 and synchro receiver 17 are both functioning properly, there being no breaks in the stator winding connecting conductors 37, 43 and 49, there will be an electrical signal of a known magnitude entering the Schmitt trigger 152, and the biasing input to said Schmitt trigger will be precisely equal to the magnitude of the aforesaid input from the buffer amplifier 147 so that the Schmitt trigger 152 will not be activated and the amplifier 175 controlled thereby will not apply a fault indicating signal to the indicator 184.

If there is a break in any of the stator winding connecting conductors or shorts across any of the stator windings of the synchros 3 and 17, the magnitude of the signal at junction 108 will now be changed due to modification of the mesh currents pertaining to the stator windings while the aforementioned biasing signal $E_b$ remains unchanged from its prior value. Due to the disparity now present between the input signals to the Schmitt trigger 152 through conductors 150 and 171, said Schmitt trigger 152 will now have an output through conductor 173 which will energize the amplifier 175 so as to cause an electrical output signal to be applied through conductor 182 which will activate the indicating signal device 184, which may be a device such as a bell or a lamp.

INTEGRITY MONITOR AND SHAFT POSITION COMPARATOR

In the application of the modified form of the invention to the Integrity Monitor and Shaft Position Comparator illustrated in FIGURE 2, corresponding parts to those heretofore discussed with reference to FIGURE 1 have been indicated by like numerals in the dual data transmission systems 1 and 1A, shown schematically by FIGURE 2, with the suffix A being applied to indicate like parts in the companion data transmission system 1A of FIGURE 2.

Figure 2:
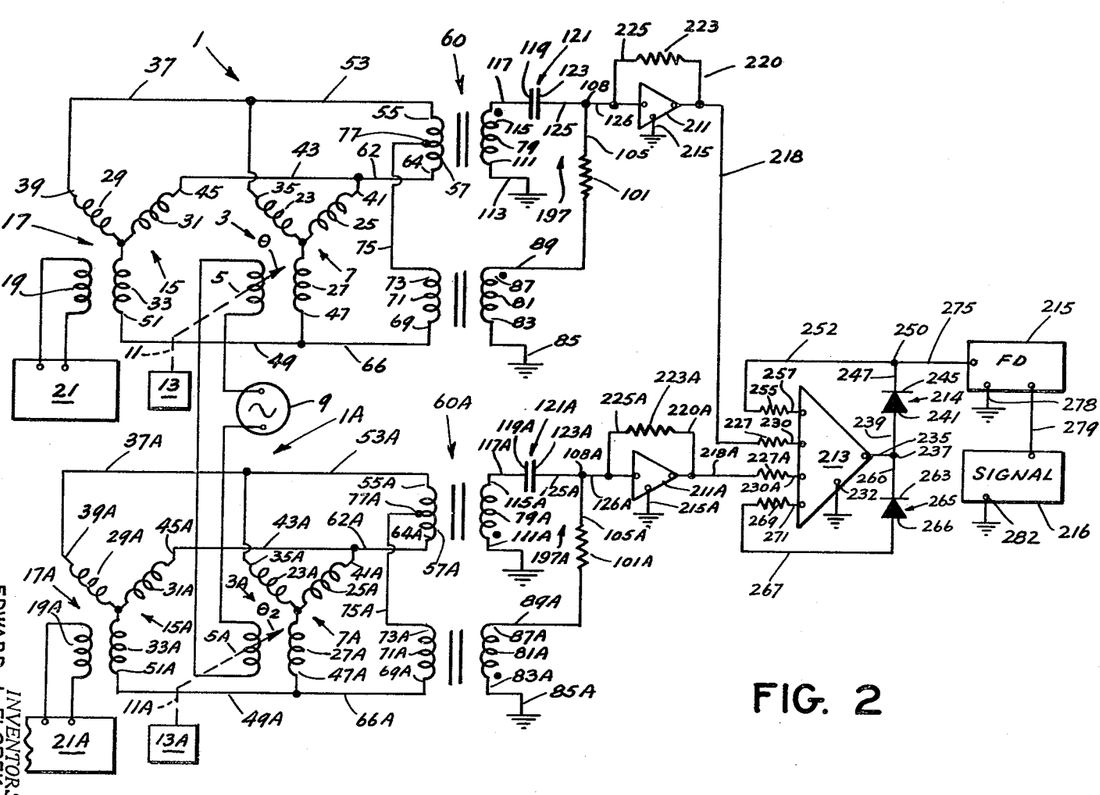
FIGURE 2 is a schematic wiring diagram of an integrity monitor and shaft position comparator embodying a modified form of the invention.
Figure 3B:
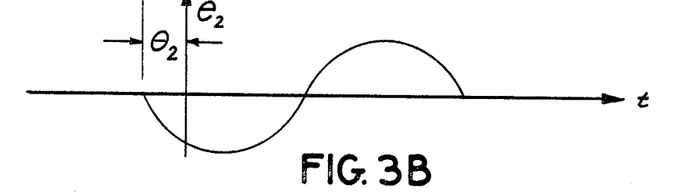
FIGURE 3B is a graphical representation of the electrical signal voltage plotted against time at the output of the Scott T 60A and resistance-capacitance network 197A of FIGURE 2 with the phase shift signal $\theta_2$ equal to the orientation of the rotor of the synchro transmitter 3A relative to a reference position and in which the signal $\theta_2$ is shown equal to $\theta_1$ of FIGURE 3A which would be the case when rotors of the synchro transmitters 3 and 3A have the same angular displacement from their respective reference positions.
Figure 3C:
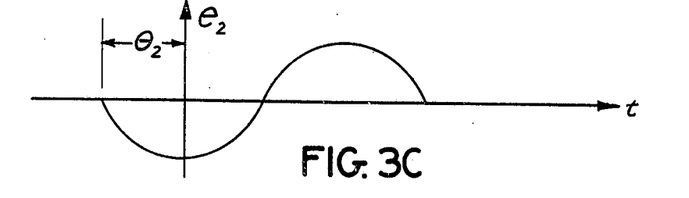
FIGURE 3C is a graphical representation of the electrical signal voltage plotted against time at the output of the Scott T 60A and resistance-capacitance network 197A of FIGURE 2, with the phase shift signal $\theta_2$ of FIGURE 3C being unequal to the phase shift signal $\theta_1$ of FIGURE 3A upon the relative angular displacements of the rotors of the synchro transmitters 3 and 3A having unequal angular displacements from their respective reference positions.
Figure 4:
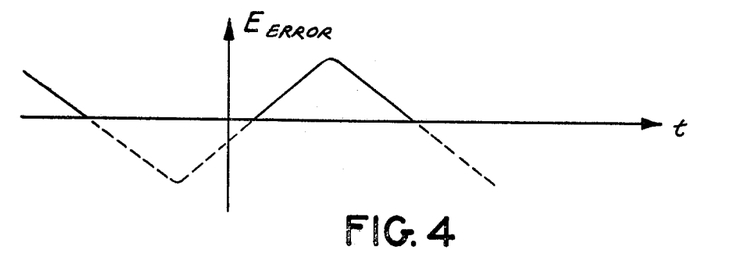

In FIGURE 2, shafts 11 and 11A provide signal information to synchro transmitters 3 and 3A which in turn are inputs to Scott T transformers 60 and 60A. The Scott T transformer 60A, as indicated diagrammatically by FIGURE 2, in addition has a sign reversal property from that provided by the Scott T 60 due to appropriate winding configuration. The Scott T transformers 60 and 60A are connected to resistance-capacitance networks 197 and 197A, respectively. The outputs of said resistance-capacitance networks 197 and 197A under normal operating conditions are shown graphically at FIGURES 3A and 3B and in turn provide A.C. input signals applied through conductors 126 and 126A to buffer amplifiers 211 and 211A. The output signals of buffer amplifiers 211 and 211A being input signals to summing amplifier 213, the resultant signal entering a half wave rectifier or diode 214, the output signal of which drives a filter detector 215 which in turn actuates an indicating device 216.

As heretofore explained with reference to FIGURE 1, the output signal voltage appearing at junction 108 is a function, in phase but not in magnitude, of the angular orientation of rotor 5. This signal voltage is applied through the conductor 126 to an input to buffer amplifier 211 which has a grounded input-output terminal 215. An output conductor 218 leading from said buffer amplifier 211 is connected by a conductor 220 to one end of a resistor 223 while an opposite end of the resistor 223 is connected through a conductor 225 to the conductor 126 leading to the input of the buffer amplifier 211 so as to provide a negative feedback circuit for the buffer amplifier 211.

The output of buffer amplifier 211 is further connected through the conductor 218 to one end of a resistor 227 having an opposite end connected through a conductor 230 to an input of a summing amplifier 213 having a grounded input-output terminal 232.

The output signal voltage appearing at junction 108A is a function, in phase but not in magnitude, of the angular orientation of rotor 5A. This signal voltage is applied through a conductor 126A to an input to the buffer amplifier 211A which has a grounded input-output terminal 215A. A output conductor 218A leading from said buffer amplifier 211A is connected through a conductor 220A to an end of resistor 223A while an opposite end of resistor 223A is connected through conductor 225A to conductor 126A leading to the input of the buffer amplifier 211A so as to provide a negative feedback circuit for buffer amplifier 211A.

The output of buffer amplifier 211A is further connected through the conductor 218A to one of resistors 227A having an opposite end connected through conductor 230A to an input to summing amplifier 213 having the grounded input-output terminal 232.

The output of summing amplifier 213 is connected through a conductor 235 to junction 237. The output junction 237 is in turn connected through conductor 239 to an anode 241 of a diode 214 having a cathode 245 connected through conductor 247 to a junction 250. The junction 250 is in turn connected through a conductor 252 to one end of a resistor 255 having an opposite end connected through a conductor 257 to an input of the summing amplifier 213. The diode 214 and resistor 255 thus provide a negative feedback circuit for the summing amplifier 213. The output junction 237 of the summing amplifier 213 is also connected through a conductor 260 to a cathode 263 of a diode 265 while an anode 266 of diode 265 is connected through conductor 267 to one end of a resistor 269 having an opposite end connected by a conductor 271 to an input of summing amplifier 213. Diode 265 and resistor 269 provide a negative feedback circuit for the summing amplifier 213.

The output of summing amplifier 213 appearing at junction 250 through diode 214 is a half wave rectified error signal, a function of the difference in orientation of rotors 5 and 5A, and this error signal is applied through a conductor 275 to the input to a filter detector 215 having an input-output terminal 278 connected to ground. An output conductor 279 leads from the detector 215 to an input of an indicating device 216, said indicator 216 having a grounded input terminal 282 and being a visual or audible signal device such as a lamp or bell.

OPERATION

In the operation of the integrity monitor and shaft position comparator of the instant invention, information as to the angular orientation $\theta_1$ and $\theta_2$ of the respective independent shafts 11 and 11A actuates the rotor windings 5 and 5A of two independent synchro transmitters which in turn are the inputs to the Scott T transformers 60 and 60A having outputs coupled to the resistance-capacitance networks 197 and 197A. The mechanical shaft inputs 11 and 11A to the rotor windings 5 and 5A of the synchro transmitters 3 and 3A may be angularly positioned by independent aircraft altimeters 13 and 13A, respectively, in which case the energization source 9 for the rotor windings 5 and 5A may be a conventional 400 cycle alternating current aircraft power supply.

In considering the operation of one of said synchro transmitters, Scott T transformer and resistance-capacitance networks, for example the synchro transmitter 3, Scott T transformer 60 and the resistance-capacitance network 197 of FIGURES 1 and 2, it may be noted that the signal at the output conductor 117 leading from the Scott T 60 is a function of the orientation of the rotor winding 5 of the synchro transmitter 3 which is in turn angularly positioned by the input shaft 11. The output, however, of the combination resistance-capacitance network 197 and the Scott T transformer 60 is an electrical signal of a magnitude independent of the position of the rotor winding 5. This is due to the fact that the values of the resistance 101 and capacitance 121 are so chosen as to cause $\omega RC$, i.e., $2\pi fRC$, where $f$ is the frequency of the common alternating current source 9, to be equal to unity as heretofore explained with reference to FIGURE 1.

Thus for the required condition that $\omega RC$ be equal to unity, the magnitude of the signal at junction 108 will then be $\sqrt{3/2}A$, or transposing, $\sqrt{3/2}E \sin \omega t$. It will be seen then that the phase shift of the signal at junction 108 will be a function of $\theta_1$, but the magnitude of said signal is independent of $\theta_1$.

This signal is now transmitted to the buffer amplifier 211, the function of which is to provide a high impedance load to the foregoing circuitry. The aforesaid signal, which is unchanged by said buffer amplifier 211 is now introduced through a resistive circuit 227 to an input of a summing amplifier 213.

The second independent shaft 11A heretofore discussed angularly positions a rotor winding 5A to control the energization of the second synchronous transmitter 3A. The resultant electrical signal passes through circuitry of synchro transmitter 3A, Scott T transformer 60A, and resistance-capacitance network 197A in a manner similar to the aforedescribed operation of the combination of synchro transmitter 3, Scott T transformer 60 and resistance-capacitance network 197, with the exception that in this second Scott T transformer 60A, the configuration of the secondary windings 79A and 81A are such that there will be a 180° phase reversal of electrical signals induced in the secondary windings 79A and 81A from that induced in the secondary windings 79 and 81, as shown diagrammatically by FIGURE 2.

The resultant signal, the magnitude of which is also dependent of the orientation of shaft 11A is dependent only in phase on the orientation of the shaft 11A to provide an input to the aforesaid summing amplifier 213.

The output of said summing amplifier 213 is an error signal determined by the relative angular displacements of said independent shafts 11 and 11A. Thus, if said shafts are angularly aligned, two signals, one 180 degrees out of phase with the other due to the 180 degree phase reversal in the second Scott T transformer 60A will enter the summing amplifier with a resultant zero output. If however, there is an angular displacement between the aforesaid shafts 11 and 11A, the difference will result in an error signal which is then sent through circuitry including diode 214 which has the property of half wave rectification. This signal in turn enters a filter detector 215 which is preset so as to have an output signal only when the input signal exceeds a predetermined critical value.

Thus, when the relative angular displacement of the aforesaid independent shafts 11 and 11A causes an error signal which exceeds a predetermined value there will be an output from said filter detector 215 which in turn will energize an indicator 216, for example, a bell or a lamp which may be used to inform of a malfunction.

It should be noted that even if the alternating current line frequency has an unintended variation, the instant invention will continue to operate as a shaft position comparator, the change being that the signals at junctions 108 and 108A will now be dependent in magnitude upon $\theta_1$ and $\theta_2$, the angular displacement from a reference point of rotor windings 5 and 5A respectively.

It should be also noted that the present invention will also monitor for wire breaks in the synchronous transmitter since in such case the magnitudes of the signals at junctions 108 and 108A will no longer be the product of equivalent circuitry although said circuitry is still energized by a common input signal.

A feature of the disclosure of FIGURE 2, which is common to that of the disclosure of FIGURE 1, resides in the provision of the synchros 3 and 3A connected to the input windings of the Scott T transformers 60 and 60A, respectively, so as to cause each synchro transmitter to induce in output windings of the respective transformers output voltages which are proportional to the sine and cosine of the synchro shaft angle $\theta$. In the systems of both FIGURE 1 and FIGURE 2, since the two outputs of each synchro transmitter differ by a 90° phase angle in space, in order to eliminate the variations in the magnitude of the sine and cosine voltages with shaft rotation, the voltages are combined in a two-element resistance-capacitance network 197 and 197A, in which the values of the resistance and capacitance are so selected as to satisfy the relationship $\omega RC=1$ at the frequency of the alternating current supplied by the source 9. The resultant voltage, then, from the resistance-capacitance network during normal operation is of a constant amplitude which is independent of the angular position of the control shafts 11 and 11A of the respective synchros 3 and 3A of FIGURE 2, or synchro 3 of FIGURE 1.

While this feature in the system of FIGURE 2 is identical to the resistance-capacitance network 197 in the output of the Scott T transformer 60 of FIGURE 1, the same is utilized in the respective systems of FIGURES 1 and 2 for somewhat different purposes. Thus, in the system of FIGURE 1, the resistance-capacitance network 197, Scott T transformer 60, and synchro transmitter 30, as shown, provide a simple means to detect a malfunction caused by a wire break or a short in the stator windings or leads of the synchros of the data transmission system 1 with a minimum of required components; while in the system of FIGURE 2, the dual resistance-capacitance networks 197 and 197A and Scott T transformers 60 and 60A are so arranged in the dual data transmission system described as to provide a novel means for monitoring the angular positions $\theta_1$ and $\theta_2$ of the control shafts 11 and 11A as well as monitor the integrity of the stator windings or leads of the synchros of the data transmission systems 1 and 1A.

What is claimed is:

1. In a data transmission system of a type including a source of alternating current of a predetermined magnitude and frequency, an alternating current signal transmitting device having a control winding energized from said source and inductive windings, a control shaft to angularly position the control winding relative to the inductive windings of said signal transmitting device, and an alternating current signal receiving device including inductive windings, several electrical conductors to operatively connect the inductive windings of the transmitting device to the inductive windings of the receiving device for transmitting alternating current signals from the transmitting device to the receiving device; the improvement comprising a fault warning system including control means, inductive means operatively coupling the control means across said several electrical conductors, said control means being responsive to the signal provided by the signal transmitting device through the inductive coupling means for providing an output signal voltage of a predetermined constant magnitude during normal operation of the signal transmitting and receiving devices and independent of said relative angular position of said control winding, a change in the magnitude of said output signal voltage being effected by the inductive coupling means through the control means upon a discontinuity arising in any one of said several electrical conductors, and means responsive to the change in the magnitude of said output signal voltage to cause the fault warning system to indicate a fault in an operative condition of said data transmission system.

2. In a data transmission system of a type including a source of alternating current of a predetermined magnitude and frequency, an alternating current signal transmitting device having a control winding energized from said source and a control shaft to angularly position the control winding in relation to inductive windings of said signal transmitting device, and an alternating current signal receiving device including inductive windings, several electrical conductors to operatively connect the inductive windings of the transmitting device to the inductive windings of the receiving device for transmitting alternating current signals from the transmitting device to the receiving device; the improvement comprising a fault warning system including control means responsive to the signal provided by the signal transmitting device for providing an output signal voltage of a predetermined magnitude during normal operation of the signal transmitting and receiving devices, a change in the magnitude of said output signal voltage being effected through the control means upon a discontinuity arising in any one of said electrical conductors, means responsive to the change in the magnitude of said output signal voltage to cause the fault warning system to indicate a fault in an operative condition of said data transmission system, the control means including a transformer having input windings operatively connected to the electrical conductors connecting the inductive windings of the transmitting device to the inductive windings of the receiving device, said transformer having output windings inductively coupled to the input windings, and a resistance-capacitance network connected to the output windings, the resistance and capacitance of said network being so selected in relation to the predetermined frequency of the alternating current supplied by the source as to effect an output signal voltage of a sinusoidal wave form having a constant magnitude during the normal balanced operation of the signal transmitting and receiving devices, and a change in the magnitude of the output signal voltage being effected through the resistance-capacitance network upon a discontinuity arising in any one of said electrical conductors.

3. The improvement defined by claim 2 including half-wave rectifier means to rectify the sinusoidal output signal voltage effected through the resistance-capacitance network, means for effecting a biasing voltage, selectively operable means to cause the fault warning system to indicate a faulty condition, said selectively operable means being jointly controlled by the output signal voltage from said rectifying means and the voltage effected by said biasing means so as to prevent the indication of a faulty condition so long as the magnitude of the rectified output signal voltage remains in a predetermined relation to the biasing voltage, while upon a discontinuance of said predetermined relation the fault warning system is rendered effective to indicate a fault in an operative condition of said data transmission system.

4. The improvement defined by claim 3 including operator-operative means to set the voltage of the biasing means to a value to effect said predetermined relation with the magnitude of the rectified output signal voltage.

5. In a data transmission system of a type including a source of alternating current of a predetermined magnitude and frequency, an alternating current signal transmitting device having a control winding energized from said source and a control shaft to angularly position the control winding in relation to inductive windings of said signal transmitting device, and an alternating current signal receiving device including inductive windings, several electrical conductors to operatively connect the inductive windings of the transmitting device to the inductive windings of the receiving device for transmitting alternating current signals from the transmitting device to the receiving device; the improvement comprising a fault warning system including control means responsive to the signal provided by the signal transmitting device for providing an output signal voltage of a predetermined magnitude during normal operation of the signal transmitting and receiving devices, a change in the magnitude of said output signal voltage being effected through the control means upon a discontinuity arising in any one of said electrical conductors, means responsive to the change in the magnitude of said output signal voltage to cause the fault warning system to indicate a fault in an operative condition of said data transmission system, the control means including a Scott T type transformer having input windings operatively connected to the electrical conductors connecting the inductive windings of the signal transmitting device to the inductive windings of the signal receiving device, said transformer having output windings inductively coupled to the input windings, and a resistance-capacitance network connected to the output windings for providing an output signal voltage having a magnitude independent of the relative angular position of said control winding.

6. The improvement defined by claim 5 in which the values of the resistance and capacitance of the resistance-capacitance network are so chosen as to make $\omega RC$ equal to unity, where $\omega$ is equal to $2\pi f$, and $f$ is equal to the frequency of the alternating current supplied by the source.

7. In a control network of a type including an alternating current signal transmitting device having a control winding, several other windings inductively coupled to the control winding, and a control shaft to angularly position the control winding in relation to the several other windings to vary the inductive coupling relation and an alternating current signal of a predetermined frequency induced by the control winding in the several other windings; a fault warning system in which the improvement comprises a control means including signal sensing means coupled across outputs of said several other windings, said control means being responsive to the alternating signal induced in the other windings, the alternating signal induced in said other windings being applied through said signal sensing coupling means so as to render said control means effective for providing an output signal voltage of a predetermined constant magnitude during a normal continuity of operation of the alternating current signal transmitting device, a change in the magnitude of said output signal voltage being effected through said control means including the signal sensing means coupled across the outputs of said other windings upon a discontinuity arising in the operation of said signal transmitting device, and means responsive to said change in magnitude of said output signal voltage to cause the fault warning system to indicate a fault in said signal transmitting device.

8. The improvement defined by claim 7 in which the control means includes a normally balanced electrical network having electrical inputs connected to the other windings of the signal transmitting device, said normally balanced electrical network having a pair of electrical outputs for providing electrical signals of values corresponding to the sine and cosine of the angular position of the control winding of the signal transmitting device in relation to the other windings thereof, and a resistance-capacitance network connected across said pair of electrical outputs, the resistance and capacitance of said resistance-capacitance network having values so selected in relation to the frequency of the alternating current signal as to effect an output signal of a constant magnitude during normal operation of the signal transmitting device, a change in the magnitude of the output signal voltage being effected through said resistance-capacitance network to render the means responsive to said change operative to cause the fault warning system to indicate a fault in an operative condition of said signal transmitting device.

9. The improvement defined by claim 7 in which the means responsive to a change in the magnitude of said output signal voltage includes a differential voltage means effective upon a substantial change in the magnitude of said output signal voltage to cause a fault warning system to indicate a faulty operative condition of said signal transmitting device.

10. The improvement defined by claim 7 in which the control means comprises a normally balanced electrical network including a Scott T type transformer having input windings connected to the other windings of the signal transmitting device, said transformer having a pair of output windings inductively coupled to the input windings for providing electrical signal voltages of values corresponding to the sine and cosine of the angular position of the control winding in relation to said other windings of the signal transmitting device, a resistance-capacitance network connected across the pair of electrical output windings, the values of the resistance and capacitance of the resistance-capacitance network being so chosen as to make $\omega RC$ equal to unity, where $\omega$ is equal to $2\pi f$, and $f$ is equal to the frequency of the alternating current signal so that the resistance-capacitance network effects an output signal voltage of a constant magnitude during normal operation of the signal transmitting device, a change in the magnitude of said output signal voltage being effected through said resistance-capacitance network upon the discontinuity arising in the operation of said signal transmitting device, and a differential voltage means responsive to the change in the magnitude of the output signal voltage effected through said resistance-capacitance network to cause the fault warning system to indicate a fault in an opertaive condition of said data transmission system.

11. In a control network of a type including dual data transmission systems, a source of alternating current of a predetermined frequency, each dual data transmission system including an alternating current signal transmitting device having a control winding energized from said source, a control shaft to angularly position the control winding in relation to inductive windings of said signal transmitting device, an alternating current signal receiving device including inductive windings, several electrical conductors to operatively connect the inductive windings of the transmitting device to the inductive windings of the receiving device for transmitting alternating current signals from the transmitting device to the receiving device, and the inductive windings of the receiving device providing alternating current output signals of a phase relation dependent upon the angular position of the control winding effected by the control shaft of the transmitting device; the improvement comprising a fault warning system including a first control means responsive to the signal provided by the signal transmitting device of one of the dual data transmission systems, said first control means providing an output signal voltage of a sinusoidal wave form having a phase corresponding to the angular position of the control winding effected by the control shaft of said one data transmission system, a second control means responsive to the signal provided by the signal transmitting device of the other of said dual data transmission systems, said second control means providing a second output signal voltage of a sinusoidal wave form having a phase corresponding to the angular position of the control winding effected by the control shaft of the other of said dual transmission systems, the phase of said second sinusoidal output signal voltage being normally one hundred and eighty degrees out of phase with the phase of the sinusoidal first output signal voltage, the first and second control means effecting the output signal voltages of corresponding magnitude during normal continuity of operation of the signal transmitting and receiving devices of said dual data transmission system, a change in the mangitude of one of said output signal voltages being effected through one of said control means upon a discontinuity arising in the operation of the signal transmitting and receiving devices corresponding to the data transmission system of said one control means, a differential voltage responsive means operated by the first and second output signal voltages for providing a differential signal voltage upon a substantial difference arising between either the phase or magnitude of the first and second sinusoidal output signal voltages, and means responsive to said differential signal voltage to cause the fault warning system to indicate a fault in an operative condition of said dual data trnsmission system.

12. The improvement defined by claim 11 in which the first and second control means each include a transformer having input windings operatively connected to the electrical conductors connecting the inductive windings of the transmitting device to the inductive windings of the receiving device, said transformer having output windings inductively coupled to the input windings, and a resistance-capacitance network connected to the output windings, the resistance and capacitance of said network being so selected in relation to the predetermined frequency of the alternating current supplied by the source as to effect an output signal voltage of a sinusoidal wave form having a constant magnitude during the normal continuity of operation of the signal transmitting and receiving devices corresponding thereto, and a change in the magnitude of the output signal voltage being effected through the resistance-capacitance network upon a discontinuity arising in the operation of the corresponding signal transmitting and receiving devices.

13. The improvement defined by claim 11 in which the first and second control means each include a Scott T type transformer having input windings operatively connected to the electrical conductors connecting the inductive windings of the signal transmitting device to the inductive windings of the signal receiving device, said transformer having output windings inductively coupled to the input windings, and a resistance-capacitance network for providing an output signal voltage corresponding in phase to the relative angular position of the control winding of the signal transmitting device, but said output signal voltage having a magnitude independent of the relative angular position of said control winding.

14. The improvement defined by claim 13 in which the values of the resistance and capacitance of the resistance-capacitance network are so chosen as to make ωRC equal to unity, where ω is equal to 2πf, and f is equal to the frequency of the alternating current supplied by the source.

15. In a control network of a type including a pair of independently operable data transmission systems, each system including an alternating current signal transmitting variable coupling transformer having a rotor winding, several stator windings inductively coupled to the rotor winding, and a control shaft to angularly position the rotor winding in relation to the stator windings to cause an alternating current signal of a predetermined frequency to be induced in the stator windings; the improvement comprising a fault warning system including a first control means responsive to the alternating current signal induced in the stator windings of one of said pair of data transmission systems, said first control means providing a first output signal voltage of a sinusoidal wave form having a phase corresponding to the angular position of the rotor winding effected by the control shaft of said one data transmission system, a second control means responsive to the signal provided by the signal transmitting transformer of the other of said data transmission systems, said second control means providing a second output signal voltage of a sinusoidal wave form having a phase corresponding to the angular position of the rotor winding effected by the control shaft of the other of said data transmission systems, the phase of said second sinusoidal output signal voltage being normally one hundred and eighty degrees out of phase with the phase of the sinusoidal first output signal voltage, the first and second control means effecting the first and second output signal voltages of corresponding magnitude during normal continuity of operation of the signal transmitting transformers, a change in the magnitude of one of said output signal voltages being effected through one of said control means upon a discontinuity arising in the operation of the signal transmitting transformer corresponding to the data transmission system of said one control means, a differential voltage responsive means operated by the first and second output signal voltages for providing a differential signal voltage upon a substantial difference arising between either the phase or magnitude of the first and second sinusoidal output signal voltages, and means responsive to said differential signal voltage to cause the fault warning system to indicate a fault in an operative condition of said data transmission systems.

16. The improvement defined by claim 15 in which the first and second control means each includes a normally balanced electrical network having electrical inputs connected to the stator windings of a corresponding signal transmitting transformer, said normally balanced electrical network having a pair of electrical outputs for providing electrical signals of values corresponding to the sine and cosine of the angular position of the rotor winding of the corresponding signal transmitting transformer in relation to the stator windings thereof, and a resistance-capacitance network connected across said pair of electrical outputs, the resistance and capacitance of said resistance-capacitance network having values so selected in relation to the frequency of the alternating current signal induced in the stator windings of the corresponding signal transmitting transformer as to effect an output signal of a constant magnitude during normal operation of the corresponding signal transmitting transformer, a change in the magnitude of said output signal being effected through said resistance-capacitance network upon the discontinuity arising in the operation of said corresponding signal transmitting transformer, and the change in the magnitude of the output signal from said resistance-capacitance network being effective to render the means which is responsive to said change operative to cause the fault warning system to indicate a fault in an operative condition of said signal transmitting transformer.

17. The improvement defined by claim 15 in which the first and second control means each includes a normally balanced electrical network including a Scott T type transformer having input windings connected to the stator windings of a corresponding signal transmitting transformer, said Scott T type transformer having a pair of output windings inductively coupled to the input windings for providing electrical signal voltages of values corresponding to the sine and cosine of the angular position of said rotor winding in relation to said stator windings of the corresponding signal transmitting transformer, a resistance-capacitance network connected across the pair of electrical output windings, the values of the resistance and capacitance of the resistance-capacitance network being so chosen as to make ωRC equal to unity, where ω is equal to 2πf, and f is equal to the frequency of the alternating current signal so that the resistance-capacitance network effects an output signal voltage of a constant magnitude during normal operation of the signal transmitting device, and a change in the magnitude of said output signal volt and a change in the magnitude of said output signal voltage being effected through said resistance-capacitance network upon the discontinuity arising in the operation of the signal transmitting transformer of the data transmission system corresponding thereto.

References Cited

UNITED STATES PATENTS

| | | | |
|---|---|---|---|
| 3,038,149 | 6/1962 | Sylvander | 340—198 |
| 3,038,150 | 6/1962 | Bechberger | 340—248 |

JOHN W. CALDWELL, Primary Examiner

DANIEL MYER, Assistant Examiner

U.S. Cl. X.R.

340—181, 248